United States Patent
Ye et al.

(10) Patent No.: US 10,270,556 B2
(45) Date of Patent: Apr. 23, 2019

(54) METHOD AND APPARATUS FOR HYBRID MULTIPLEXING/DE-MULTIPLEXING IN PASSIVE OPTICAL NETWORK

(71) Applicant: Alcatel Lucent, Boulogne Billancourt (FR)

(72) Inventors: Chenhui Ye, Shanghai (CN); Kaibin Zhang, Shanghai (CN)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 15/557,584

(22) PCT Filed: Mar. 3, 2016

(86) PCT No.: PCT/IB2016/000393
§ 371 (c)(1),
(2) Date: Sep. 12, 2017

(87) PCT Pub. No.: WO2016/147049
PCT Pub. Date: Sep. 22, 2016

(65) Prior Publication Data
US 2018/0048416 A1 Feb. 15, 2018

(30) Foreign Application Priority Data
Mar. 13, 2015 (CN) .......................... 2015 1 0109919

(51) Int. Cl.
*H04J 14/02* (2006.01)
*H04B 10/2575* (2013.01)
(Continued)

(52) U.S. Cl.
CPC .... *H04J 14/0298* (2013.01); *H04B 10/25752* (2013.01); *H04B 10/27* (2013.01); *H04B 10/548* (2013.01); *H04B 10/5563* (2013.01)

(58) Field of Classification Search
CPC .............. H04B 10/25752; H04B 10/27; H04B 10/548; H04J 14/0298
See application file for complete search history.

(56) References Cited

U.S. PATENT DOCUMENTS

| 6,717,929 B1* | 4/2004 | Ooba | H04B 1/70735 370/335 |
| 2008/0131120 A1* | 6/2008 | Yu | H04B 10/2587 398/58 |

(Continued)

FOREIGN PATENT DOCUMENTS

| CN | 101867542 A | 10/2010 |
| EP | 2 670 103 A1 | 12/2013 |

(Continued)

OTHER PUBLICATIONS

International Search Report for PCT/IB2016/000393 dated Jun. 30, 2016.

(Continued)

*Primary Examiner* — Dzung D Tran
(74) *Attorney, Agent, or Firm* — Fay Sharpe LLP

(57) ABSTRACT

The present disclosure discloses a method and an apparatus for hybrid multiplexing/de-multiplexing in a passive optical network, the method comprising steps of: dividing N first intermediate frequency sub-bands averagely into M clusters, wherein each of the clusters contains K first intermediate frequency sub bands and N=M*K, and wherein each of the K first intermediate frequency sub-bands carries a baseband digital electrical signal; selecting, by a software defined first intermediate frequency multiplexer, the baseband digital electrical signals of K first intermediate frequency sub-bands from the N first intermediate frequency sub-bands for software defined frequency division multiplexing and forming a cluster; and frequency division multiplexing, by an analog (Continued)

hardware cluster multiplexer, analog electrical signals of the M clusters on a second intermediate frequency sub-band.

12 Claims, 10 Drawing Sheets

(51) Int. Cl.
  *H04B 10/548* (2013.01)
  *H04B 10/556* (2013.01)
  *H04B 10/27* (2013.01)

(56) References Cited

U.S. PATENT DOCUMENTS

| | | | |
|---|---|---|---|
| 2008/0298813 A1* | 12/2008 | Song | H04B 10/25758 398/178 |
| 2009/0081978 A1 | 3/2009 | Chen et al. | |
| 2010/0028002 A1 | 2/2010 | Qian et al. | |
| 2011/0296399 A1 | 12/2011 | Tugnawat et al. | |
| 2013/0028347 A1* | 1/2013 | Oga | H04L 5/0007 375/295 |

FOREIGN PATENT DOCUMENTS

| | | |
|---|---|---|
| JP | 201390220 A | 5/2013 |
| JP | 2013526818 A | 6/2013 |
| JP | 2013131842 A | 7/2013 |

OTHER PUBLICATIONS

English Bibliography for Japanese Patent Application No. JP2013090220A, published May 13, 2013, printed from Derwent Innovation on Oct. 18, 2018; 4 pp.

English Bibliography for Japanese Patent Application No. JP2013131842A, published Jul. 4, 2013, printed from Derwent Innovation on Oct. 18, 2018; 4 pp.

English Bibliography for Japanese Patent Application No. JP2013526818A, published Jun. 24, 2013, printed from Derwent Innovation on Oct. 18, 2018; 4 pp.

PCT Patent Application No. PCT/IB2016/000393, Written Opinion of the International Searching Authority, dated Jun. 30, 2016; 6 pages.

Bibliography of Chinese Patent Application No. CN101867542A, Published on Oct. 20, 2010, Printed from Derwent Innovation on Jan. 23, 2019, 4 pages.

* cited by examiner

METHOD AND APPARATUS FOR HYBRID MULTIPLEXING/DE-MULTIPLEXING IN PASSIVE OPTICAL NETWORK

TECHNICAL FIELD

The present disclosure generally relates to the filed of optical communication, and more particularly to a method and an apparatus for hybrid multiplexing/de-multiplexing in a passive optical network.

BACKGROUND OF THE INVENTION

For the growing demands of bandwidth in 4G LTE or upcoming 5G mobile network, a basic consensus on cloud Coordinated Radio Access Network (C-RAN) that dominates the Next Generation Mobile Network (NGMN) has been achieved among the organizations and leading companies in the industry/market. To strongly support and facilitate the implementation of C-RAN, key technique breakthroughs in massive-capacity fronthaul transmission will become powerful drives from the aspects of both technology and the business.

Recently, standardization groups such as Full Service Access Network (FSAN) and International Telecom Union-Telecommunication (ITU-T) forum have started working groups on Mobile FrontHaul (MFH) transmission issues. Meanwhile, China Mobile, the world's largest communication corporation, has been spearheading trials and plans to deploy C-RAN systems as early as 2015. Japan's NTT DOCOMO said it will follow the deployment of C-RAN systems in 2016. The highlight of C-RAN technology is that it can carry out the centralized baseband Digital Signal Processing (DSP) calculation, and efficiently control/manage the cost for the Baseband Unit (BBU) processing, concentrated cooling provision and real estate purchasing/renting.

In the existing technology, there are two types of transmission approaches to implement MFH of C-RAN: Digitized Radio over Fiber (D-RoF) and Analog Radio over Fiber (A-RoF). The two most typical protocol implementations of D-RoF are Common Public Radio Interface (CPRI) and Open Base station Standard Initiative (OBSAI) as shown in FIG. 1B. FIG. 1A shows a schematic diagram of a D-RoF based optical network architecture. Since the degradation induced by the D-RoF based MFH transmission is negligible, D-RoF is preferred in current 4G era, but D-RoF requires very large bandwidth resources. With the booming of MFH capacity enhancement such as massive MIMO advanced applications, D-RoF will become a sub-optimal selection due to its requirement on bandwidth.

A second MFH approach is A-RoF; with the assistance of advanced DSP, the approach can sustain the signal quality in the MFH operation, exhibit flexibility in terms of wireless parameters and require much less optical transmission bandwidth compared with D-RoF. In the network architecture as shown in FIG. 2A, the data to (or from) each antenna is carried over individual Intermediate Frequency (IF) sub-bands in a Quadrature Amplitude Modulation (QAM) format. The conceptual diagram corresponding to FIG. 1B is shown in FIG. 2B. It indicates that by introducing a Digital to Analog Converter (DAC) and an Analog to Digital Converter (ADC) respectively in the BBU and a Remote Radio Header (RRH), CPRI data can be mapped to QAM constellations in an analog manner. Due to the maturity of DSP technology, the analog transmission can deliver information with high spectra efficiency at affordable expenses. For instance, a cell (e.g., equipped with 24 antennas) requires only a 480 MHz bandwidth in theory for 4G LTE MFH, which means that one 1 GHz optical transceiver (TRx) is sufficient to accommodate 6 RRHs (corresponding to 6 sectors) with 48 antennas, while one 10 GHz D-RoF TRx can only transmit 8 antennas. A brief comparison between the two approaches, i.e. A-RoF and D-RoF in terms of performance has been concluded in Table 1.

TABLE 1

Comparison between D-RoF and A-RoF MFH

| 8 Antennas 3 Sectors | Request | Protocol | Format | Note |
|---|---|---|---|---|
| CPRI MFH | three 10G TRx | TDM | OOK | TRx |
| A-RoF MFH | one 1G TRx | IFDM | OFDM-QAM | ADC/DAC |

Currently, one of the most challenging problems to block A-RoF MFH from being widely implemented is the stringent request for the broadband ADC/DAC module. As shown in FIG. 2A, in an A-RoF MFH based on the C-RAN architecture, data for each antenna is carried on individual IF sub-carriers in the MFH link, some of which (e.g., IF sub-bands from #1 to #8) are allocated at low frequency bands and their corresponding IF bandwidths locate at 50 MHz to 210 MHz, and some of which (e.g., IF sub-bands from #17 to #24) are allocated at very high frequency bands and their corresponding IF bandwidths locate at 370 MHz to 530 MHz. Therefore, the broadband ADC and DAC must be installed in the RRH, where its target data is allocated at the high end of the frequency axis. In fact, IF sub-band allocation algorithms can be determined flexibly in the BBU, which means that each RRH must be equipped with a full-bandwidth ADC and DAC. In a word, with the increase of antenna numbers in the MFH links, the broadband ADC and DAC are required in the BBU and RRH, which requires a very high cost.

Currently, there is no solution to resolve this problem yet. However, one of the most simple and straightforward approaches for IF multiplexing/de-multiplexing is to employ a HardWare (HW) frequency mixer. By using the HW frequency mixer, target data can be converted between the baseband and IF channels and a narrow-band DAC or ADC are competent to process the data on each channel. However, the problem is that it would ask for as many HW frequency mixers as the antennas in one cell (e.g., 24 antennas or more in NGMN), and the product cost as well as complexity issues make this pure-HW depended approach not practical.

SUMMARY OF THE INVENTION

To solve the above technical problem, the present disclosure discloses a method and an apparatus for hybrid multiplexing/de-multiplexing in a passive optical network.

According to a first aspect of the present disclosure, there is provided a method for hybrid multiplexing in a passive optical network, the method comprising steps of: A. dividing N first intermediate frequency sub-bands averagely into M clusters, wherein each of the clusters contains K first intermediate frequency sub-bands and N=M*K, and wherein each of the K first intermediate frequency sub-bands carries a baseband digital electrical signal; B. selecting, by a software defined first intermediate frequency multiplexer, baseband digital electrical signals of K first intermediate frequency sub-bands from the N first intermediate frequency sub-bands for software defined frequency division multiplexing and forming a cluster; and C. frequency division multiplexing, by an analog hardware cluster multiplexer, analog electrical signals of the M clusters on a second intermediate frequency sub-band.

Advantageously, after the step B, the method further comprises: converting the digital electrical signal obtained by multiplexing of the software defined first intermediate frequency multiplexer into an analog electrical signal, and employing a hardware cluster local oscillator to convert the analog electrical signal to a second intermediate frequency in an analog hardware second frequency mixer in an analog hardware manner so as to provide a local oscillation signal source.

Advantageously, before the step B, the method further comprises: converting, by a nth software defined local oscillator, a nth baseband digital electrical signal to a nth first intermediate frequency sub-band through a nth first frequency mixer in a digital software manner, frequency of the first intermediate frequency being not higher than that of the second intermediate frequency to implement multi-stage frequency division multiplexing, wherein n denotes an index of the first intermediate frequency sub-band and n is a positive integer not greater than N.

Advantageously, K is the number of antennas equipped in a cell.

Advantageously, a variable frequency of the software defined local oscillator can be adjusted according to a load demand, wherein adjusting parameters include frequency, amplitude and phase.

Advantageously, after the step C, the method further comprises: modulating the electrical signal obtained by multiplexing of the hardware cluster multiplexer into optical signals.

According to a second aspect of the present disclosure, there is provided an apparatus for hybrid multiplexing in a passive optical network, the apparatus comprising: M software defined first intermediate frequency multiplexers, each of which is configured to select baseband digital electrical signals of K first intermediate frequency sub-bands from N first intermediate frequency sub-bands for multiplexing and forming a cluster, wherein the N first intermediate frequency sub-bands are divided averagely into M clusters each containing K first intermediate frequency sub-bands and N=M*K, and wherein each of the K first intermediate frequency sub-bands carries a baseband digital electrical signal; and a hardware cluster multiplexer configured to frequency division multiplex electrical signals of the M clusters on a second intermediate frequency sub-band.

Advantageously, the apparatus further comprises: M digital to analog converters, each of which is configured to convert a digital electrical signal obtained by multiplexing of a software defined first intermediate frequency multiplexer into an analog electrical signal; and M hardware cluster local oscillators, each of which is configured to convert the analog electrical signal to a second intermediate frequency in an analog hardware second frequency mixer in an analog hardware manner so as to provide a local oscillation signal source.

Advantageously, the apparatus further comprises: N software defined local oscillators, each of which is configured to convert a nth baseband digital electrical signal to a nth first intermediate frequency through a nth first frequency mixer in a digital software manner, a frequency of the first intermediate frequency being not higher than that of the second intermediate frequency to implement multi-stage frequency division multiplexing, wherein n denotes an index of the first intermediate frequency sub-band and n is a positive integer not greater than N.

Advantageously, K is the number of antennas equipped in a cell.

Advantageously, a variable frequency of the software defined local oscillator can be adjusted according to a load demand, wherein adjusting parameters include frequency, amplitude and phase.

Advantageously, the apparatus further comprises: a photoelectric modulator configured to modulate the electrical signal obtained by multiplexing of the hardware cluster multiplexer into an optical signal.

The solution disclosed by the present disclosure has at least the following advantages:

1. High Cost-Effectiveness: a balance between the software defined intermediate frequency multiplexer and the hardware cluster multiplexer is implemented in the hybrid A-RoF scheme so that C-RAN can accommodate large quantities of antennas and meanwhile can greatly reduce the cost by using the existing narrow-banded DAC/ADC and low-complexity DSP with a moderate price;

2. Flexibility: the software defined intermediate frequency multiplexer and the hardware cluster multiplexer in the hybrid A-RoF scheme is transparent to the wireless parameters, and by only adjusting the configurations in the software defined intermediate frequency multiplexer and the corresponding hardware cluster multiplexer, the system can support not only the current 4G LTE but also the NGMN system.

Comparing to the current D-RoF solution such as CPRI or OBSAI, taking 96 intermediate frequency sub-bands as an example, the solution of the present disclosure has 12 times enhancement in the supported antenna quantity.

Comparing to the most straightforward solution for an intermediate frequency multiplexer only based on a hardware frequency mixer, the hybrid A-RoF solution proposed by the present disclosure can implement a large scale antenna solution by the affordable DAC/ADC and low-complexity DSP.

BRIEF DESCRIPTION OF THE DRAWINGS

The above and other features of the present disclosure will become more obvious by making references to the following detailed description of the embodiments in conjunction with the accompanying drawings, and in the accompanying drawings of the present disclosure, the same or similar reference signs represent the same or similar steps.

DESCRIPTION OF PREFERRED EMBODIMENTS

In the following specific description of the preferred embodiments, the appended accompanying drawings constituting part of the present disclosure will be referred to. The appended accompanying drawings illustrate by way of example the particular embodiments capable of achieving the present disclosure. The exemplary embodiments do not aim to exhaust all embodiments of the present disclosure. It needs to be explained that although steps about the method in the present disclosure are described here in a specific order, it does not require or suggest that these operations must be executed according to the specific order, or all of the illustrated operations must be executed to achieve an expected result; on the contrary, the steps described here can be changed in the execution order. Additionally or alternatively, some steps may be omitted, multiple steps can be combined into one for execution, and/or one step may be decomposed into multiple steps for execution.

The method and apparatus for multiplexing/de-multiplexing in a passive optical network as disclosed by the present application will be introduced in detail in conjunction with FIGS. 3-7.

Figure 1A:
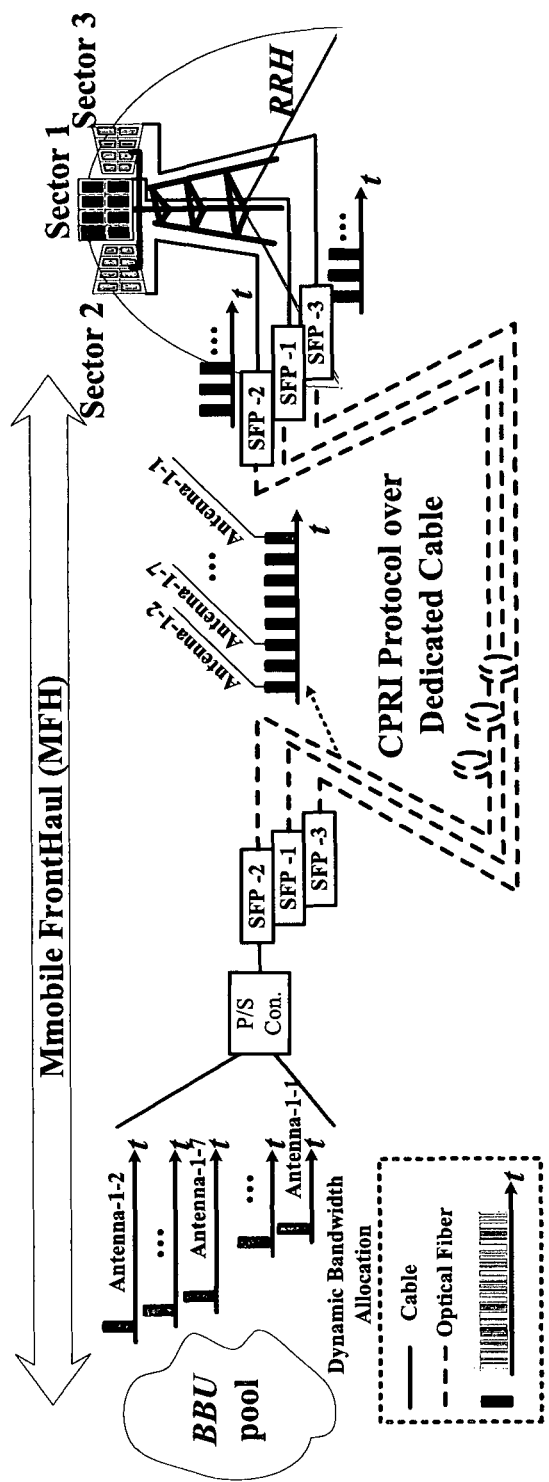
FIG. 1A shows a schematic diagram of a D-RoF based optical network architecture.
Figure 1B:
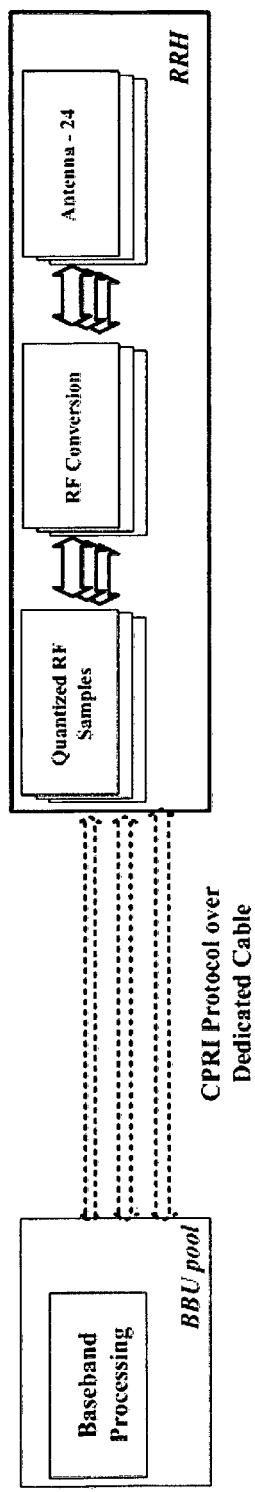
FIG. 1B shows a schematic diagram of the existing D-RoF solution employing CPRI.
Figure 2A:
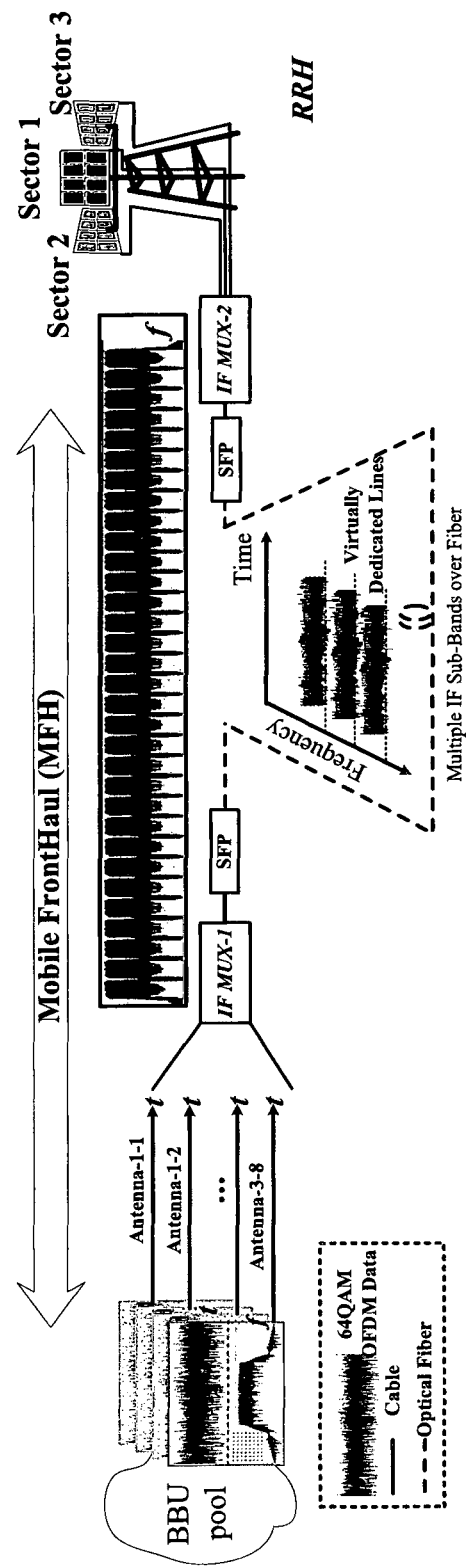
FIG. 2A shows a schematic diagram of an optical network architecture employing an intermediate frequency multiplexer.
Figure 2B:
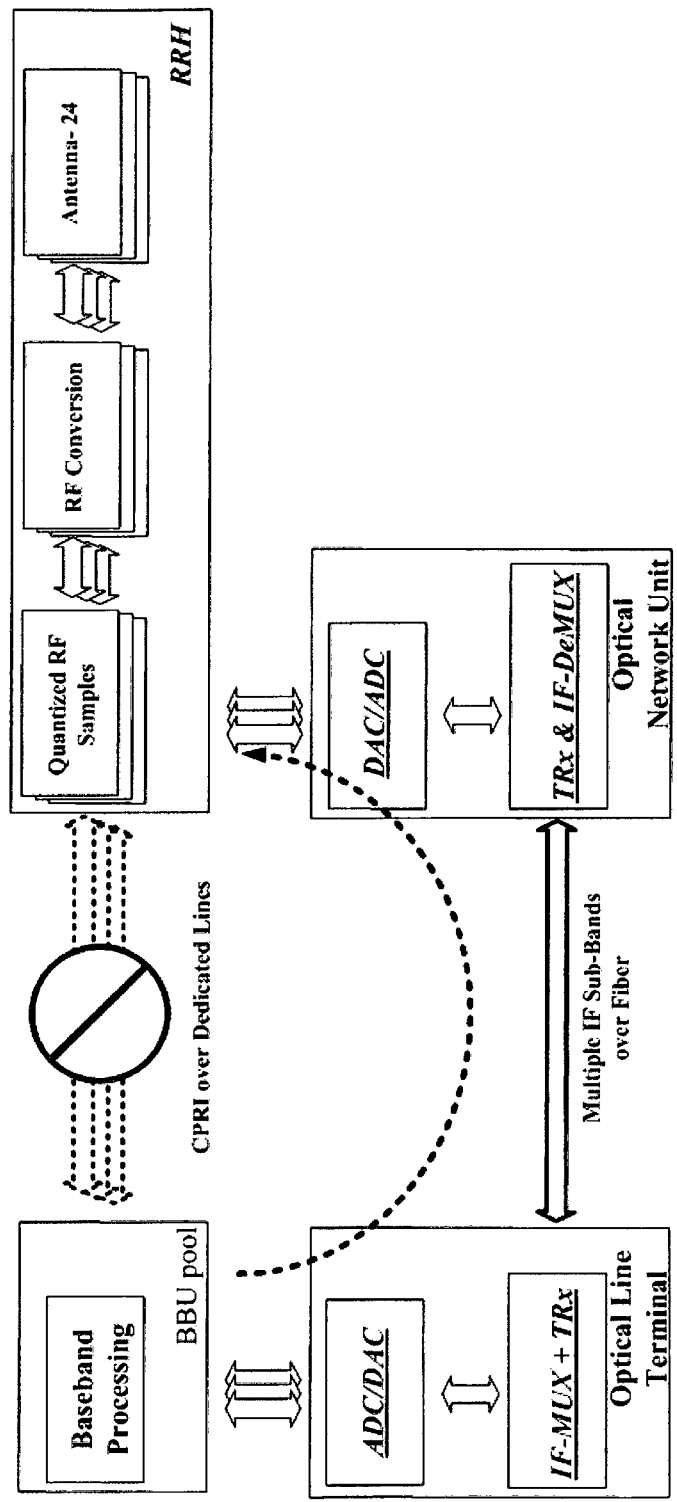
FIG. 2B shows a schematic diagram of an A-RoF solution having ADC/DAC and IF multiplexer/de-multiplexer.
Figure 3:
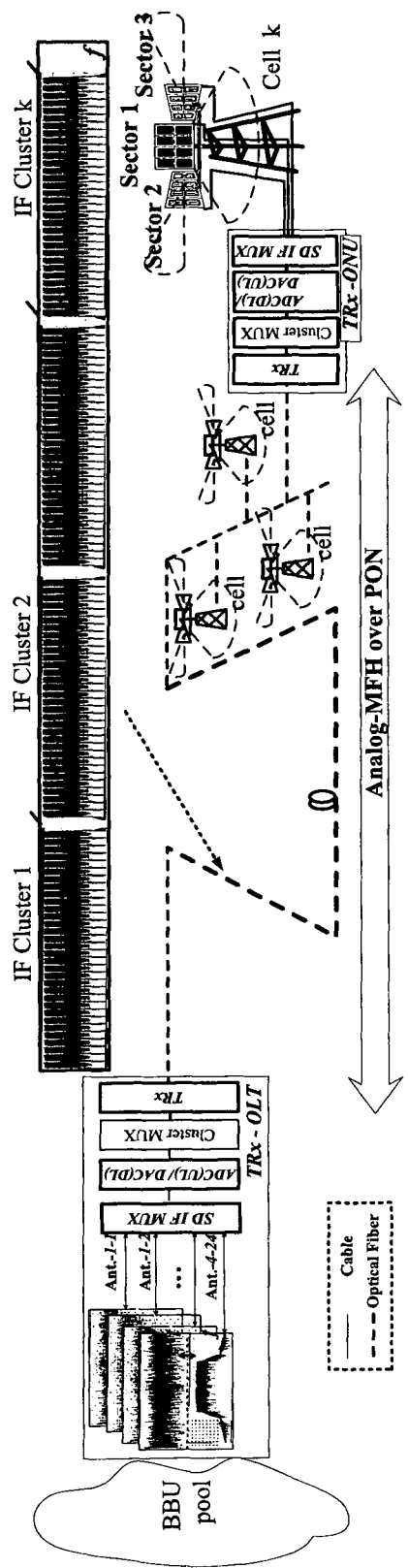
FIG. 3 shows a schematic diagram of an optical network architecture of a hybrid A-RoF containing a software defined IF multiplexer and an analog hardware cluster multiplexer according to embodiments of the present disclosure.

FIG. 3 shows a schematic diagram of an optical network architecture of a hybrid A-RoF containing software defined IF multiplexers and analog hardware cluster multiplexers according to embodiments of the present disclosure. A BBU pool outputs in parallel for example baseband data of 96 branches. Each of the 96 baseband data is firstly QAM mapped and multiplexed in frequency domain, and an Electrical to Optical Converter (EOC) modulates the analog data onto light-waves, which is transmitted over an access network of Passive Optical Network (PON) architecture to a remote base station. At the receiver side, each cell selects its corresponding IF cluster containing 24 data channels and has the cluster sampled and quantized, and then performs DSP based IF de-multiplexing (DeMUX) and QAM demodulation, and finally transmits 24 baseband data to each antenna.

Figure 4:
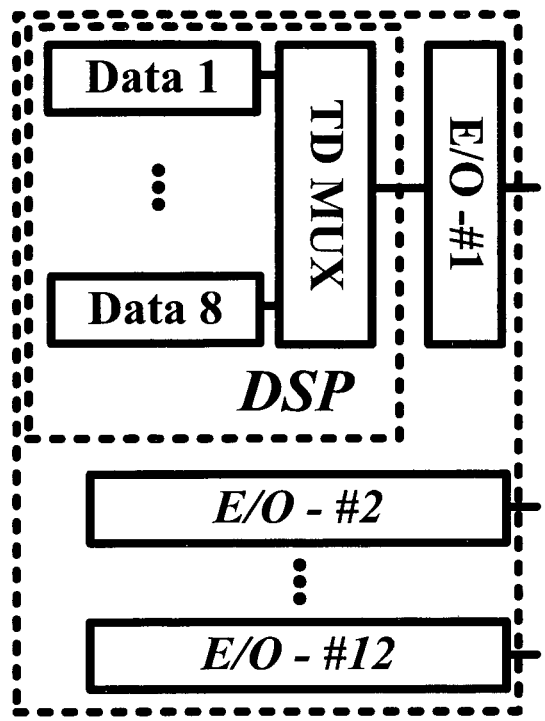
FIG. 4 shows a schematic diagram of the conventional A-RoF optical line terminal.

FIG. 4 shows a schematic diagram of the conventional A-RoF Optical Line Terminal (OLT). The conventional A-RoF has a time domain multiplexer (MUX) implemented in DSP. In order to support 96 antennas, 12 pieces of DSP and optical TRx are required.

Figure 5:
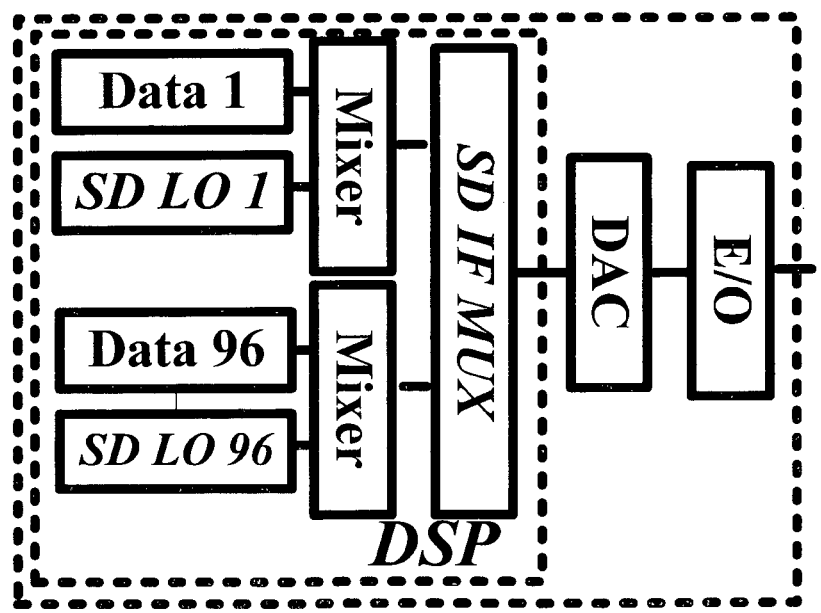
FIG. 5 shows a schematic diagram of an A-RoF optical line terminal according to embodiments of the present disclosure.

FIG. 5 shows a schematic diagram of an A-RoF OLT according to an embodiment of the present disclosure. The OLT in FIG. 5 has Software Defined IF MUXs (SD IF MUXs) and Software Defined Local Oscillators (SD LOs) implemented in DSP. Assuming that there are 96 baseband digital electrical signals, the nth software defined local oscillator converts the nth baseband digital electrical signal to the nth first intermediate frequency sub-band through the nth first frequency mixer in a digital software manner. Then, the software defined first IF multiplexer performs software defined frequency division multiplexing on the 96 first intermediate frequency sub-bands. The digital electrical signal obtained by the multiplexing of the software defined first IF multiplexer is converted into an analog electrical signal, and a photoelectric modulator modulates the multiplexed electrical signal into an optical signal. Since the baseband digital electrical signals are directly multiplexed in the SD IF MUX in DSP, a full bandwidth DAC is needed.

Figure 6:
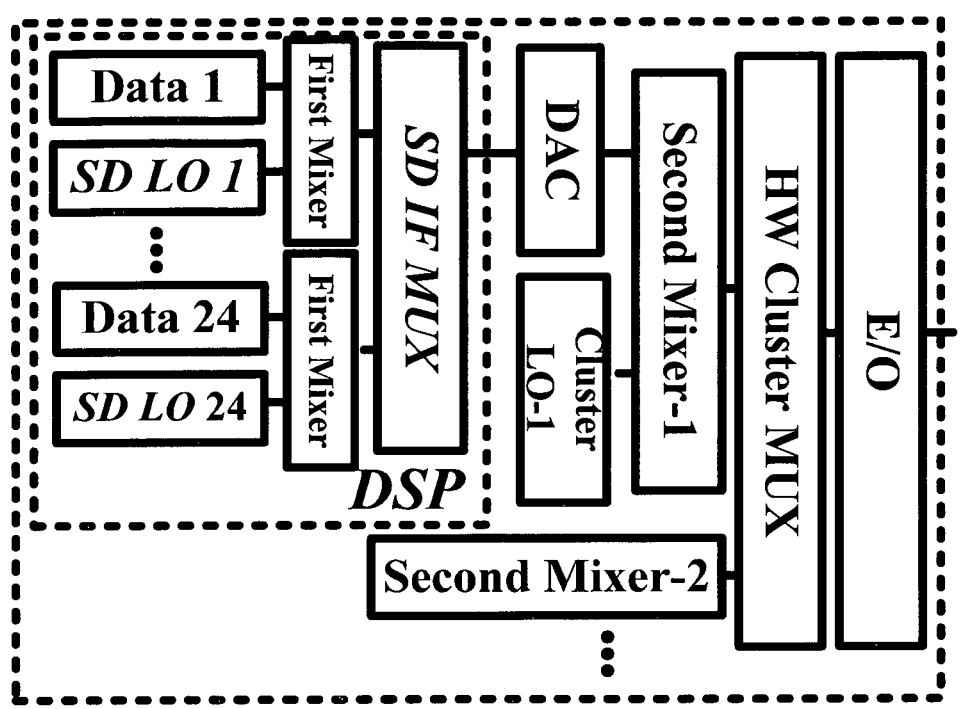
FIG. 6 shows a schematic diagram of an A-RoF optical line terminal according to another embodiment of the present disclosure.

FIG. 6 shows a schematic diagram of an A-RoF OLT according to another embodiment of the present disclosure.

Firstly, N (e.g., N=96) first intermediate frequency sub-bands are averagely divided into M (e.g., M=4) clusters, wherein each of the clusters contains K (K=24) first intermediate frequency sub-bands and N=M*K, and wherein each of the 24 different first intermediate frequency sub-bands carries a baseband digital electrical signal. K can be the number of antennas equipped in the cell. N denotes the number of the first intermediate frequency sub-bands, M denotes the number of the clusters, and K denotes the number of the first intermediate frequency sub-bands in a cluster.

Then, a software defined first intermediate frequency multiplexer selects baseband digital electrical signals of K first intermediate frequency sub-bands from the N first intermediate frequency sub-bands for software defined frequency division multiplexing and forming a cluster.

Thirdly, an analog hardware cluster multiplexer applies frequency division multiplexing to analog electrical signals of the M clusters on a second intermediate frequency sub-band.

In the DSP block as shown in FIG. 6, the nth software defined local oscillator converts the nth baseband digital electrical signal to the nth first intermediate frequency sub-band through the nth first frequency mixer in a digital software manner, and a frequency of the first intermediate frequency is not higher than that of the second intermediate frequency to implement multi-stage frequency division multiplexing, wherein n denotes an index of the first intermediate frequency sub-band and n is a positive integer not greater than N. It should be understood by those skilled in the art that although FIG. 6 shows two-stage frequency division multiplexing, it does not constitute a limit to the implementation and application manners of the present disclosure, and if necessary, the same or similar idea can also be used to implement three-stage or higher-stage frequency division multiplexing.

For example, 96 baseband digital electrical signals are converted to 96 different first IF sub-bands through respective first frequency mixers, and then a software defined first IF multiplexer selects the baseband digital electrical signals of 24 first IF sub-bands from the 96 first IF sub-bands for software defined frequency division multiplexing and forming a cluster. The digital electrical signal obtained by multiplexing of the software defined first IF multiplier is converted into an analog electrical signal, and a hardware cluster LO is employed to convert the analog electrical signal to a second IF in the analog hardware second frequency mixer in an analog hardware manner so as to provide a local oscillation signal source. The analog hardware cluster multiplexer applies frequency division multiplexing to the analog electrical signals of 4 clusters on the second intermediate frequency sub-band to form an analog electrical signal. Finally, the electrical signal obtained by the multiplexing of the hardware cluster multiplexer is modulated into an optical signal.

The software defined first IF multiplexer has flexibility in changing or adjusting the frequency of the first intermediate frequency sub-bands due to an expansion of bandwidth and/or an increase in the number of the intermediate frequency sub-bands. The hardware cluster multiplexer has the advantage of reducing the hardware request on ADC/DAC bandwidth and the corresponding cost. In this way, the solution of hybrid A-RoF having the software defined first IF multiplexer and the hardware cluster multiplexer achieves a balance between software capacity and hardware complexity, and the above solution of hybrid A-RoF has good compatibility with the existing CPRI based MFH link system architecture.

As shown in FIGS. 5 and 6, a variable frequency of the software defined local oscillator can be adjusted according to load demand, wherein adjusting parameters include frequency, amplitude and phase.

Taking 96 baseband digital electrical signals in FIG. 6 as an example, the OLT in FIG. 6 may include:

4 software defined first intermediate frequency multiplexers, each of which is configured to select the baseband digital electrical signals of 24 first intermediate frequency sub-bands from 96 first intermediate frequency sub-bands for multiplexing and forming a cluster; and 1 hardware cluster multiplexer configured to apply frequency division multiplexing to the electrical signals of 4 clusters on a second intermediate frequency sub-band.

Comparing to FIG. 5, the DAC module in the solution of FIG. 6 has a relatively narrow bandwidth and achieves high cost-effectiveness of devices and flexibility of configuration through two-stage frequency conversion of software and hardware. Correspondingly, at the receiving end, after the frequency conversion of hardware, the sampling bandwidth of ADC in each RRH only needs to reach ¼ of the total data bandwidth to obtain the required data, and then through the frequency conversion of software, the 24 frequency division multiplexed baseband data can be parsed.

The optical line terminal as shown in FIG. 6 further includes:

4 digital to analog converters, each of which is configured to convert the digital electrical signal obtained by multiplexing of respective software defined first intermediate frequency multiplexer into an analog electrical signal;

4 hardware cluster local oscillators, each of which is configured to convert the analog electrical signal to a second intermediate frequency in an analog hardware second frequency mixer in an analog hardware manner so as to provide a local oscillation signal source;

96 software defined local oscillators, each of which is configured to convert the nth baseband digital electrical signal to the nth first intermediate frequency through the nth first frequency mixer in a digital software manner, a frequency of the first intermediate frequency being not higher than that of the second intermediate frequency to implement multi-stage frequency division multiplexing, wherein n denotes an index of a first intermediate frequency sub-band and n is a positive integer not greater than N; and a photoelectric modulator configured to modulate the electrical signal obtained by multiplexing of the hardware cluster multiplexer into an optical signal.

It should be understood by those skilled in the art that according to the embodiment as shown in FIG. 6, the number of the first frequency mixer and the second frequency mixer may be 96 and 4, respectively.

FIG. 5 and FIG. 6 show solutions of intermediate frequency multiplexing of the hybrid A-RoF in OLT in the downlink direction. It should be appreciated by those skilled in the art that in the corresponding Optical Network Unit (ONU), there is also a de-multiplexing solution corresponding to the intermediate frequency multiplexing solution of the hybrid A-RoF in the OLT, which is not detailed here. Similarly, in the uplink direction, the ONU may also employ the hybrid A-RoF multiplexing solution as same as or similar to that in the OLT as shown in FIG. 5 and FIG. 6, and thus a corresponding de-multiplexing solution can be employed in the OLT for uplink.

Figure 7:
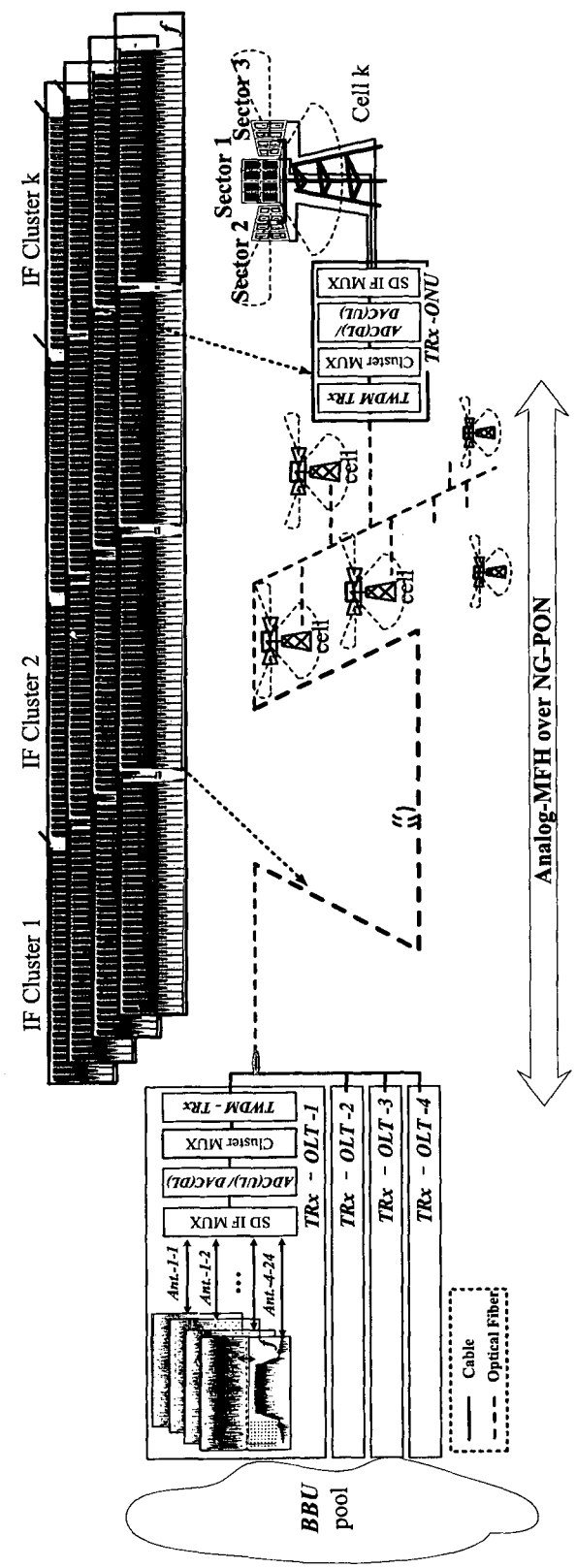
FIG. 7 shows a schematic diagram of an optical network architecture of an optical line terminal as shown in FIG. 6.

FIG. 7 shows a schematic diagram of an optical network architecture of an optical line terminal as shown in FIG. 6. It is possible to achieve the compatibility in smooth evolution from current PON to next generation PON by only changing the conventional Transceiver (TRx) into Time and Wavelength Division Multiplexed TRx (TWDM-TRx).

In the next generation PON architecture based on A-RoF MFH having hardware cluster multiplexers and software defined multiplexers, each remote cell must have an extra step to select the target wavelength first before the cluster selection and then to perform IF de-multiplexing and QAM demodulation.

Figure 8:
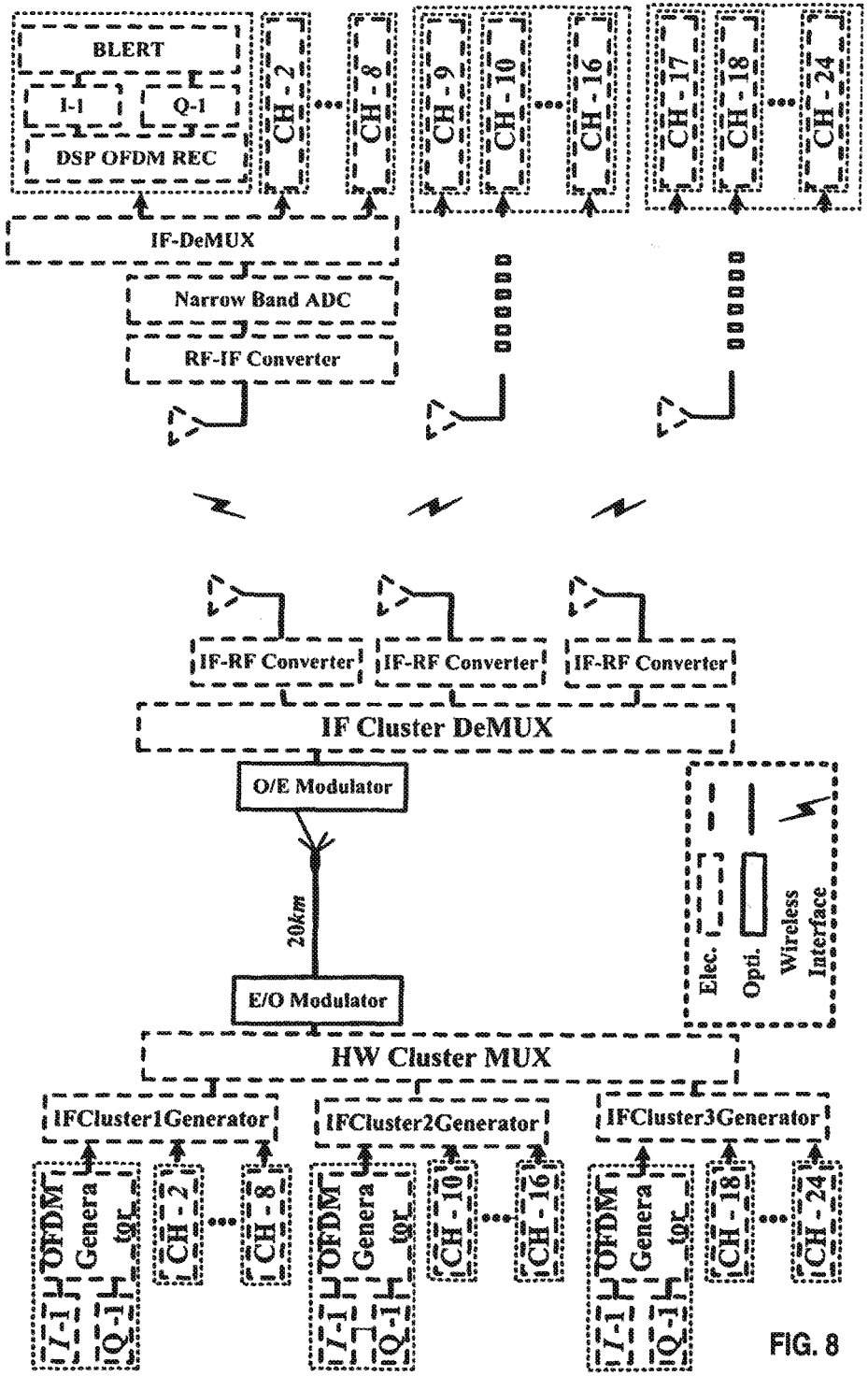
FIG. 8 shows a schematic diagram of the experimental validation configuration according to embodiments of the present disclosure.
Figure 9:
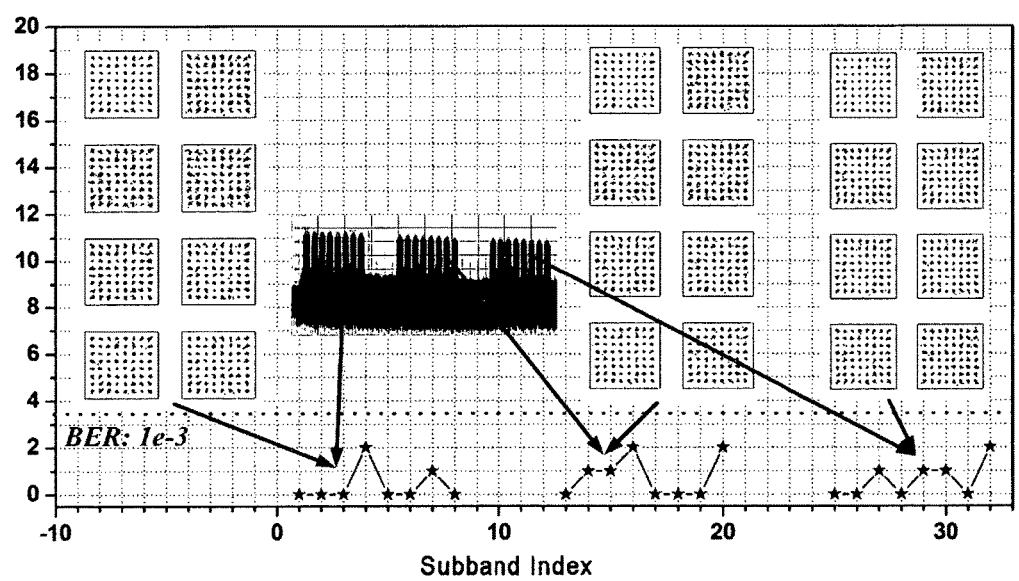
FIG. 9 shows a schematic diagram of a constellation diagram of the experimental validation configuration as shown in FIG. 8.

FIG. 8 shows a schematic diagram of the experimental validation configuration according to embodiments of the present disclosure. In order to verify the solution of a hybrid A-RoF having software defined first intermediate frequency multiplexers and hardware cluster multiplexers, as shown in FIG. 8, 3 clusters each containing 8 first intermediate frequency sub-bands are generated at the transmitting end. Each of the 24 baseband digital electrical signals is formatted in 64 QAM and with 25 Mbps baud rate. 20 km of single mode fiber represents the MFH distance from the BBU pool to the RRHs. After passing through the photoelectric modulator, each cluster containing 8 first intermediate frequencies is converted to 3.5 GHz radio frequency (3 dB bandwidth of the antenna is about 200 MHz around 3.5 GHz), and is launched over a wireless interface to a wireless receiver. DSP in a PC demodulates the data over the 8 first intermediate frequency sub-bands contained by each cluster, and meanwhile tests its Block Error Rate (BER). FIG. 9 shows a schematic diagram of a constellation diagram of the experimental validation configuration as shown in FIG. 8. As the experimental results indicate, the BER of each sub-band is below $10^{-3}$.

For those skilled in the art, it is obvious that the present disclosure is not limited to the details of the above exemplary embodiments, and the present disclosure can be implemented in other specific forms under the premise of not departing from spirits or basic characteristics of the present disclosure. Thus, at any rate, the embodiments should be regarded as exemplary and nonrestrictive. In addition, obviously, the term "comprising" or "including" does not exclude other elements and steps, and the term "a" or "an" does not exclude a plurality. Multiple elements recited in the apparatus claims can also be implemented by one element. The terms such as first, second, etc. are used to represent names, rather than representing any specific order.

The invention claimed is:

1. A method for hybrid multiplexing in a passive optical network, the method comprising:
dividing N first intermediate frequency sub-bands evenly into M clusters, wherein each of the clusters contains K first intermediate frequency sub-bands and N=M*K, and wherein each of the K first intermediate frequency sub-bands carries a baseband digital electrical signal;
selecting, by a software defined first intermediate frequency multiplexer, baseband digital electrical signals of K first intermediate frequency sub-bands for each M cluster of the N first intermediate frequency sub-bands for software defined frequency division multiplexing to form multiplexed digital electrical signals for each M cluster suitable for conversion into analog electrical signals for each M cluster; and frequency division multiplexing, by an analog hardware cluster multiplexer, the analog electrical signals of the M clusters on a second intermediate frequency sub-band to form a multiplexed analog electrical signal.

2. The method according to claim 1, wherein, after the selecting, further comprising:

converting each multiplexed digital electrical signal obtained by multiplexing of the corresponding software defined first intermediate frequency multiplexer into the analog electrical signal for the corresponding cluster, and employing a hardware cluster local oscillator to convert each analog electrical signal to a second intermediate frequency in an analog hardware second frequency mixer in an analog hardware manner so as to provide a local oscillation signal source for each cluster.

3. The method according to claim 2, wherein, before the selecting, further comprising:

converting, by a nth software defined local oscillator, a nth baseband digital electrical signal to a nth first intermediate frequency sub-band through a nth first frequency mixer in a digital software manner, a frequency of the first intermediate frequency being not higher than that of the second intermediate frequency to implement multi-stage frequency division multiplexing, wherein n denotes an index of the first intermediate frequency sub-band and n is a positive integer not greater than N.

4. The method according to claim 3, wherein a variable frequency of the software defined local oscillators can be adjusted according to a load demand, wherein adjusting parameters for adjusting said variable frequency of the software defined local oscillators include frequency, amplitude and phase.

5. The method according to claim 1, wherein K is the number of antennas equipped in a cell.

6. The method according to claim 1, wherein, after the frequency division multiplexing by the analog hardware cluster multiplexer, further comprising:

modulating the multiplexed analog electrical signal obtained by the frequency division multiplexing of the analog hardware cluster multiplexer into an optical signal.

7. An apparatus for hybrid multiplexing in a passive optical network, the apparatus comprising:

M software defined first intermediate frequency multiplexers, each of which is configured to select baseband digital electrical signals of K first intermediate frequency sub-bands to form a cluster from N first intermediate frequency sub-bands for software defined frequency division multiplexing to form a multiplexed digital electrical signal for the corresponding cluster that is suitable for conversion into an analog electrical signal for the corresponding cluster, wherein the N first intermediate frequency sub-bands are divided evenly into M clusters each containing the K first intermediate frequency sub-bands and N=M*K, and wherein each of the K first intermediate frequency sub-bands carries a baseband digital electrical signal; and an analog hardware cluster multiplexer configured to frequency division multiplex the analog electrical signals of the M clusters on a second intermediate frequency sub-band to form a multiplexed analog electrical signal.

8. The apparatus according to claim 7, wherein the apparatus further comprises:

M digital to analog converters, each of which is configured to convert the multiplexed digital electrical signal obtained by multiplexing of the corresponding software defined first intermediate frequency multiplexer into the analog electrical signal for the corresponding cluster; and M hardware cluster local oscillators, each of which is configured to convert the analog electrical signal for the corresponding cluster to a second intermediate frequency in an analog hardware second frequency mixer in an analog hardware manner so as to provide a local oscillation signal source for the corresponding cluster.

9. The apparatus according to claim 8, wherein the apparatus further comprises:

N software defined local oscillators, each of which is configured to convert a nth baseband digital electrical signal to a nth first intermediate frequency through a nth first frequency mixer in a digital software manner, a frequency of the first intermediate frequency being not higher than that of the second intermediate frequency to implement multi-stage frequency division multiplexing, wherein n denotes an index of a first intermediate frequency sub-band and n is a positive integer not greater than N.

10. The apparatus according to claim 9, wherein a variable frequency of the N software defined local oscillators can be adjusted according to a load demand, wherein adjusting parameters for adjusting said variable frequency of the N software defined local oscillators include frequency, amplitude and phase.

11. The apparatus according to claim 7, wherein K is the number of antennas equipped in a cell.

12. The apparatus according to claim 7, wherein the apparatus further comprises:

a photoelectric modulator configured to modulate the multiplexed analog electrical signal obtained by the frequency division multiplexing of the analog hardware cluster multiplexer into an optical signal.

* * * * *